United States Patent
Dodds et al.

(10) Patent No.: US 12,067,462 B2
(45) Date of Patent: Aug. 20, 2024

(54) MODEL TRAINING FRAMEWORK

(71) Applicant: Oath Inc., New York, NY (US)

(72) Inventors: Eric Mcvoy Dodds, Berkeley, CA (US); Huy Xuan Nguyen, Dublin, CA (US)

(73) Assignee: Yahoo Assets LLC, New York, NY (US)

( * ) Notice: Subject to any disclaimer, the term of this patent is extended or adjusted under 35 U.S.C. 154(b) by 1105 days.

(21) Appl. No.: 16/541,751

(22) Filed: Aug. 15, 2019

(65) Prior Publication Data

US 2021/0049500 A1  Feb. 18, 2021

(51) Int. Cl.
*G06N 20/00* (2019.01)
*G06F 11/36* (2006.01)
*G06F 17/18* (2006.01)

(52) U.S. Cl.
CPC ......... *G06N 20/00* (2019.01); *G06F 11/3664* (2013.01); *G06F 17/18* (2013.01)

(58) Field of Classification Search
CPC ...... G06N 20/00; G06F 11/3664; G06F 17/18
See application file for complete search history.

(56) References Cited

U.S. PATENT DOCUMENTS

2018/0157939 A1* 6/2018 Butt .................. G06V 10/454
2020/0334524 A1* 10/2020 Sprague ............... H04L 67/12

OTHER PUBLICATIONS

Mlflow/mlflow. [Code Repository] Github.com: committed on Aug. 12, 2019 [retrieved on Aug, 10, 2022]. Retrieved from <<https://github.com/mlflow/mlflow/tree/69fabbcf59b690f021bf047c0bf3e2de594c70e6>> (Year: 2019).*
Abadi et al. "TensorFlow: A System for Large-Scale Machine Learning" 12th USENIX Symposium on Operating Systems Design and Implementation; ISBN 978-1-931971-33-1 [retrieved on Aug. 9, 2022] (Year: 2016).*
Peixeiro, M. "How to Improve a Neural Network With Regularization" Medium.com [Blog post] Published Mar. 2019 [retrieved on Aug. 10, 2022]. (Year: 2019).*
Floydhub/save-and-resume. [Code Repository] Github.com: committed on Nov. 22, 2017 [retrieved on Aug. 10, 2022]. Retrieved from <<https://github.com/floydhub/save-and-resume>> (Year: 2017).*

(Continued)

*Primary Examiner* — Rehana Perveen
*Assistant Examiner* — Alfred H B Wechselberger
(74) *Attorney, Agent, or Firm* — Cooper Legal Group LLC (57) ABSTRACT

One or more computing devices, systems, and/or methods for a model training framework are provided. A definition and configuration of a model are received. Computations that the model will perform during training of the model are setup based upon the definition and configuration. Summary statistics to be tracked during training are specified. A batch of training data is input into the model to train the model based upon hyper parameters specified in the configuration of the model, and the summary statistics are tacked during the training. The parameters of the model are updated based upon a function corresponding to accuracy of the model processing the training data. The summary statistics are outputted.

20 Claims, 8 Drawing Sheets

(56) References Cited

OTHER PUBLICATIONS

Papper, M. "Debugging Tensorflow" [Blog] Published Mar. 3, 2019 [retrieved on Aug. 11, 2022]. <<Retrieved from https://www.paepper.com/blog/posts/debugging-tensorflow/>> (Year: 2019).*
Ruede, R. "Backchannel Prediction for Conversational Speech Using Recurrent Neural Networks" [Thesis] Institute for Anthropomatics and Robotics, Interactive Systems Lab [retrieved on Aug. 9, 2022]. (Year: 2016).*
Balancap/tf-imagenet. [Code Repository] Github.com: committed on Mar. 7, 2018 [retrieved on Aug. 10, 2022]. Retrieved from <<https://github.com/balancap/tf-imagenet>> (Year: 2018).*
Sergeev et al. "Horovod: fast and easy distributed deep learning in TensorFlow" arXiv:1802.05799v3 [cs.LG] [retrieved on Mar. 25, 2023] (Year: 2018).*
Blot et al. "Gossip training for deep learning" arXiv:1611.09726v1 [cs.CV] [retrieved on Mar. 25, 2023] (Year: 2016).*
Keras-team/keras. [Code Repository] Github.com: committed on Mar. 12, 2019 [retrieved on Mar. 25, 2023] Retrieved from <<https://github.com/keras-team/keras/blob/995f1e708fc189fd2a6786be96edf82abab2c599/keras/callbacks/callbacks.py>> (Year: 2019).*
Salvaris et al. "Deep Learning with Azure" Editors, Apress; https://doi.org/10.1007/978-1-4842-3679-6 [retrieved on Mar. 27, 2024] (Year: 2018).*
Baylor et al. "TFX: A TensorFlow-Based Production-Scale Machine Learning Platform" KDD'17, Aug. 13-17, 2017, Halifax, NS, Canada [retrieved on Mar. 27, 2024] (Year: 2017).*
Bonawitz et al. "Towards Federated Learning at Scale: System Design" Proceedings of the 2 nd SysML Conference, Palo Alto, CA, USA, 2019 [retrieved on Mar. 27, 2024] (Year: 2019).*
Miao et al. "Towards Unified Data and Lifecycle Management for Deep Learning" 2017 IEEE 33rd International Conference on Data Engineering [retrieved on Mar. 27, 2024] (Year: 2017).*
Horovod/horovod [Code Repository] Github.com: committed on Aug. 13, 2019 [retrieved on Mar. 27, 2024]. Retrieved from <<https://github.com/horovod/horovod/tree/e621787043ef5ff1f5ced6ee9ab6b4a487cf8170>> (Year: 2019).*
Silberman, et al., "TF-Slim: A high level library to define complex models in TensorFlow", https://ai.googleblog.com/2016/08/tf-slim-high-level-library-to-define.html, Aug. 30, 2016, 3 pages.
"Keras: The Python Deep Learning Library", https://keras.io/, Retrieved on Aug. 2, 2019, 1 page.
"Caffe", https://caffe.berkeleyvision.org/tutorial/, Retrieved on Aug. 2, 2019, 3 pages.
"From Research to Production", https://pytorch.org/, Retrieved on Aug. 2, 2019, 3 pages.
Jia, et al., "Caffe: Convolutional Architecture for Fast Feature Embedding", https://arxiv.org/abs/1408.5093, Jun. 20, 2014, 4 pages.
Nguyen, et al., "Prototrain", https://github.com/yahoo/Prototrain, Mar. 2019, 5 pages.
Dodds, et al., "Learning Embeddings for Product Visual Search with Triplet Loss and Online Sampling", https://arxiv.org/abs/1810.04652, Oct. 10, 2018, 6 pages.

* cited by examiner

MODEL TRAINING FRAMEWORK

BACKGROUND

Machine learning can be utilized to perform various types of tasks. For example, machine learning can be used for image recognition, video recognition, text recognition, generating recommendations, data security, fraud detection, online search, natural language processing, etc. A machine learning model is trained using a training data set of labeled data samples, such as where the machine learning model is trained with photos labeled as "photo of a car" and "photo not of a car." After training, the machine learning model can process other photos in order to predict whether such photos depict a car or not. There are various types of machine learning models, such as decision trees, support vector machines, k-nearest neighbors, random forests, linear regression, logistic regression, gradient boosting algorithms, etc.

In order to train a particular machine learning model and evaluate performance of the machine learning model from the training, custom programming code must be manually written to train the machine learning model. Unfortunately, manually writing custom programming code for every individual machine learning model is cumbersome and resource intensive.

SUMMARY

In accordance with the present disclosure, one or more computing devices and/or methods for a model training framework are provided. The model training framework can be used to train any type of model that is input into the model training framework. For example, a definition of a model and a configuration of the model is received by the model training framework. The definition and configuration of the model may describe the model, what computations the model performs, what parameters the model uses during operation, what hyper parameters should be used to train the model, regularization to apply to the parameters, a learning rate, a training loss function, whether and when checkpoints are to be created, whether and when to enable a debugging mode, a training batch size of training data to input per training iteration, a decay learning rate, optimization procedures to implement, etc. The model training framework may save a record of the model based upon the definition and configuration according to a human readable text format and/or a machine readable serialized format.

The model training framework may setup computations that the model will perform during training of the model based upon the definition and the configuration. The computations may be spread/assigned across a plurality of processing units, such as graphical processing units, such that outputs by the processing units may be aggregated to determine an output of the model during training. Summary statistics that are to be tracked and/or reported out during training may be specified. The summary statistics may correspond to a training loss function, a value of a regularization loss added to the parameters of the model during training, a learning rate, checkpoints created during training, a training batch size, a number of steps performed by the computations, values of parameters during training, a total training time, etc.

The model training framework may be configured to perform one or more training iterations to train the model using batches of training data. For example, a first batch of training data is inputted into the model during a first training iteration. The model may perform the computations upon the first batch of training data. During the first training iteration, the summary statistics are tracked. After the first training iteration, the parameters of the model are updated based upon a function (e.g., the parameters are updated in a manner that minimize a loss function). The updated parameters of the model may be used during a second training iteration to process a second batch of the training data. In this way, any number of training iterations may be performed by the model training framework. The summary statistics of the training may be outputted by the model training framework, such as to a user that requested the training of the model.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
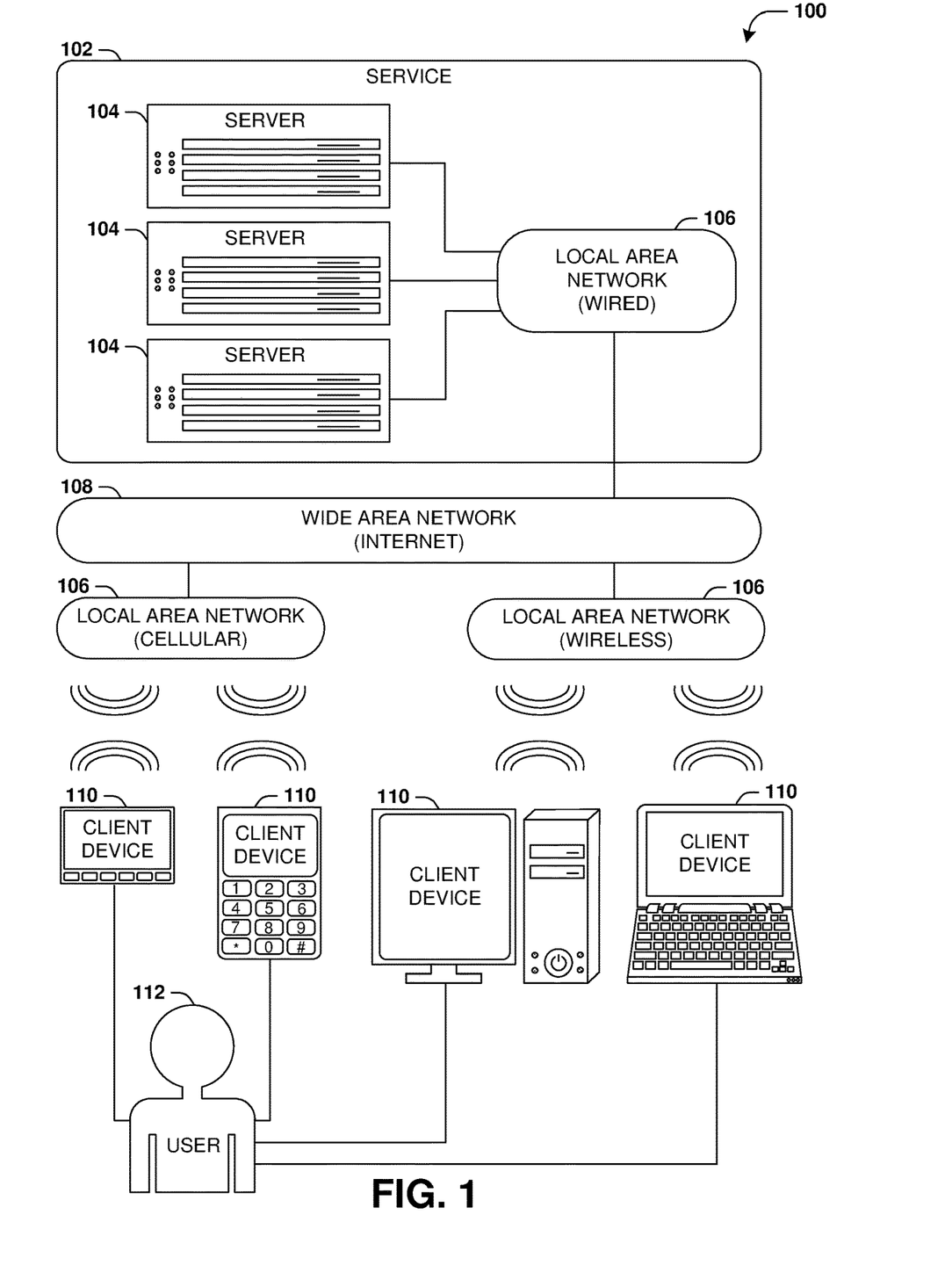
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
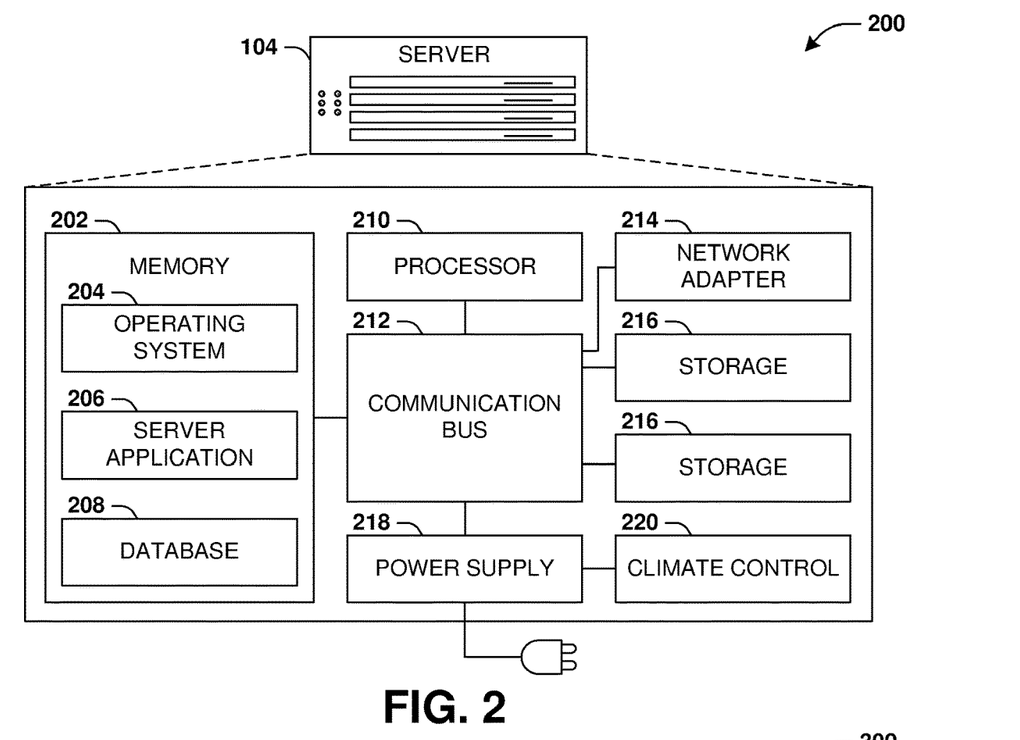
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
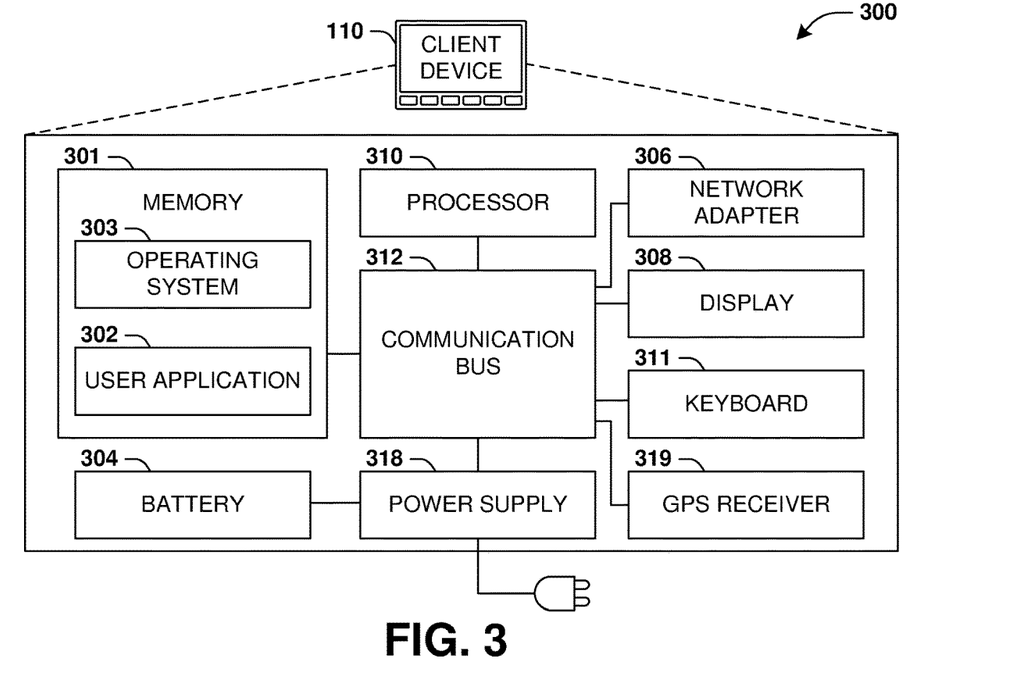
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Techniques are provided for a model training framework. The model training framework is configured to train any type of model, such as various types of machine learning models, which are input into the model training framework. This allows a developer of a model to train the model using the model training framework without having to write custom code tailored to that particular model. This greatly reduces the manual human effort and resources otherwise wasted in writing such custom code for each individual model. Furthermore, the time and resources used to train the model are improved because the training can be spread across multiple processors by the model training framework. Furthermore, a ranking model is provided with improve accuracy for processing input images for identifying other similar images such as images that depict the same object as the input image.

Figure 4:
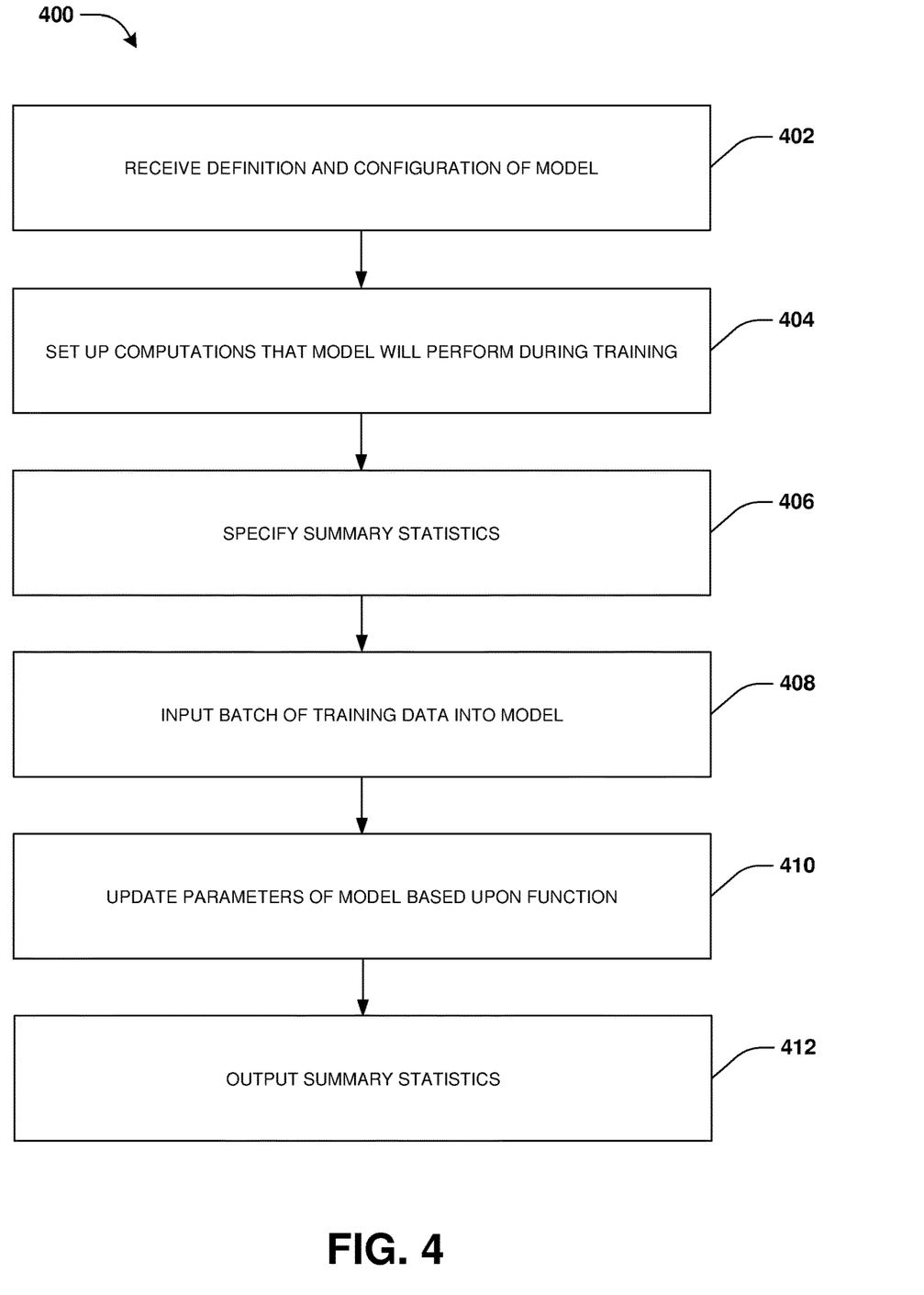
FIG. 4 is a flow chart illustrating an example method for a model training framework.

An embodiment of a model training framework 502 is illustrated by an example method 400 of FIG. 4, which is described in conjunction with system 500 of FIGS. 5A-5D. The model training framework 502 may comprise simple and easy to use application programming interfaces (APIs) through which a user can input a model 506 and information about the model 506 for training the model 506. Accordingly, the model training framework 502 receives input 504 of a definition and configuration of the model 506, at 402. The definition and configuration may describe the model 506, inputs of the model 506, outputs of the model 506, computations performed by the model 506, modifiable parameters of the model 506, hyper parameters used to train the model 506, and/or other information relating to operation of the model 506 and/or training of the model 506, such as a training loss function, regularization to add to the parameters, a learning rate, a batch size of input data to train per training iteration, whether and when a debug mode should be enabled, whether and when checkpoints should be created, a decay learning rate, an initial learning rate value, optimizations to apply to the model 506 during training, etc.

Figure 5A:
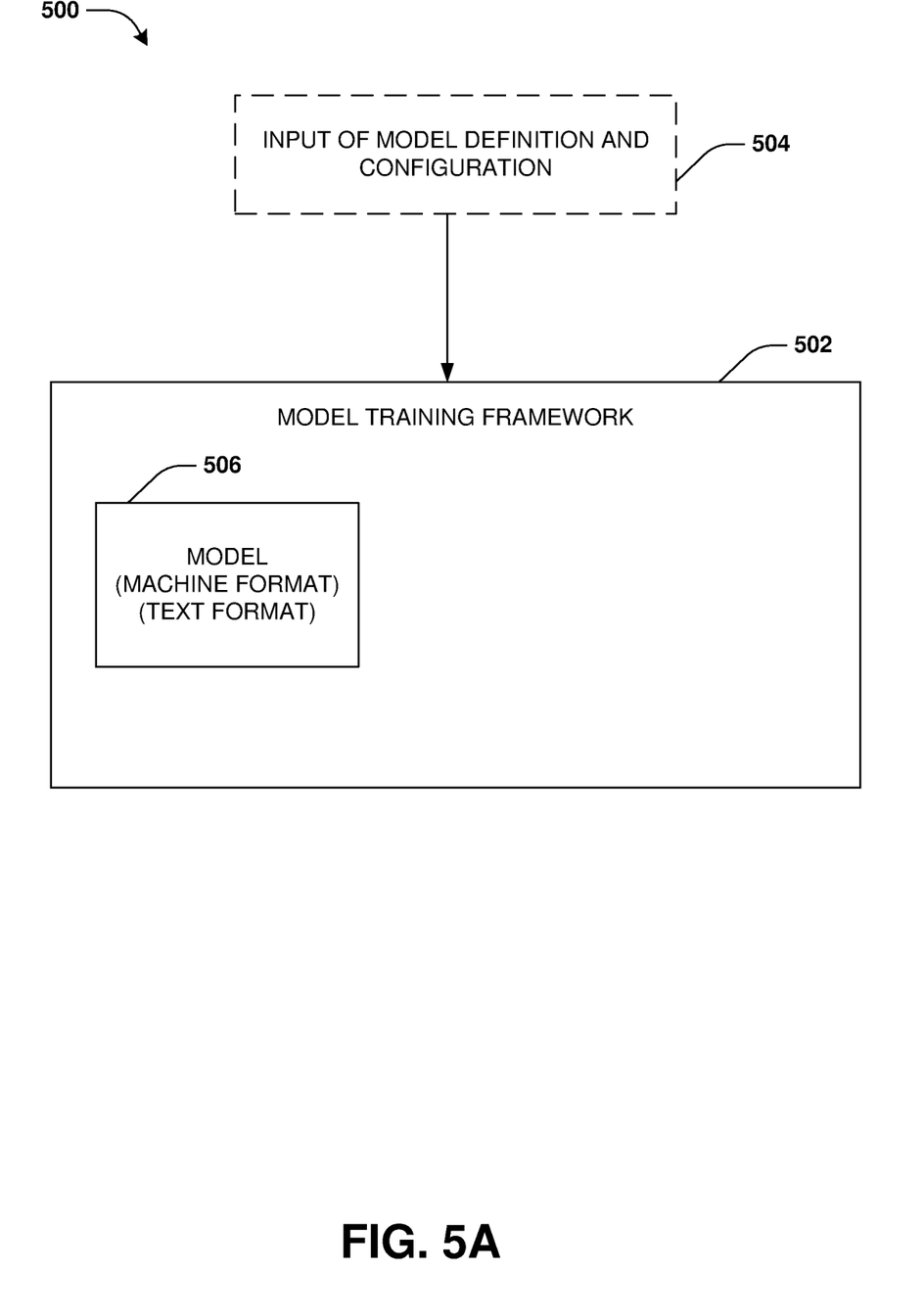
FIG. 5A is a component block diagram illustrating an example system for a model training framework, where a model definition and configuration is received.

The model training framework 502 may store a record of the model 506 as a structure having a serialized machine readable format and/or a textual human readable format. The record may comprise information relating to the definition and configuration of the model 506, along with information related to the training of the model 506, such as checkpoints created during the training, a training batch size, an initial learning rate value, a decay learning rate, parameters of the model 506, values of the parameters during various points in time during training, etc. In this way, the user can view and interpret the record in the textual human readable format, and the model training framework 502 can access and train the model 506 using the record in the serialized machine readable format.

Figure 5B:
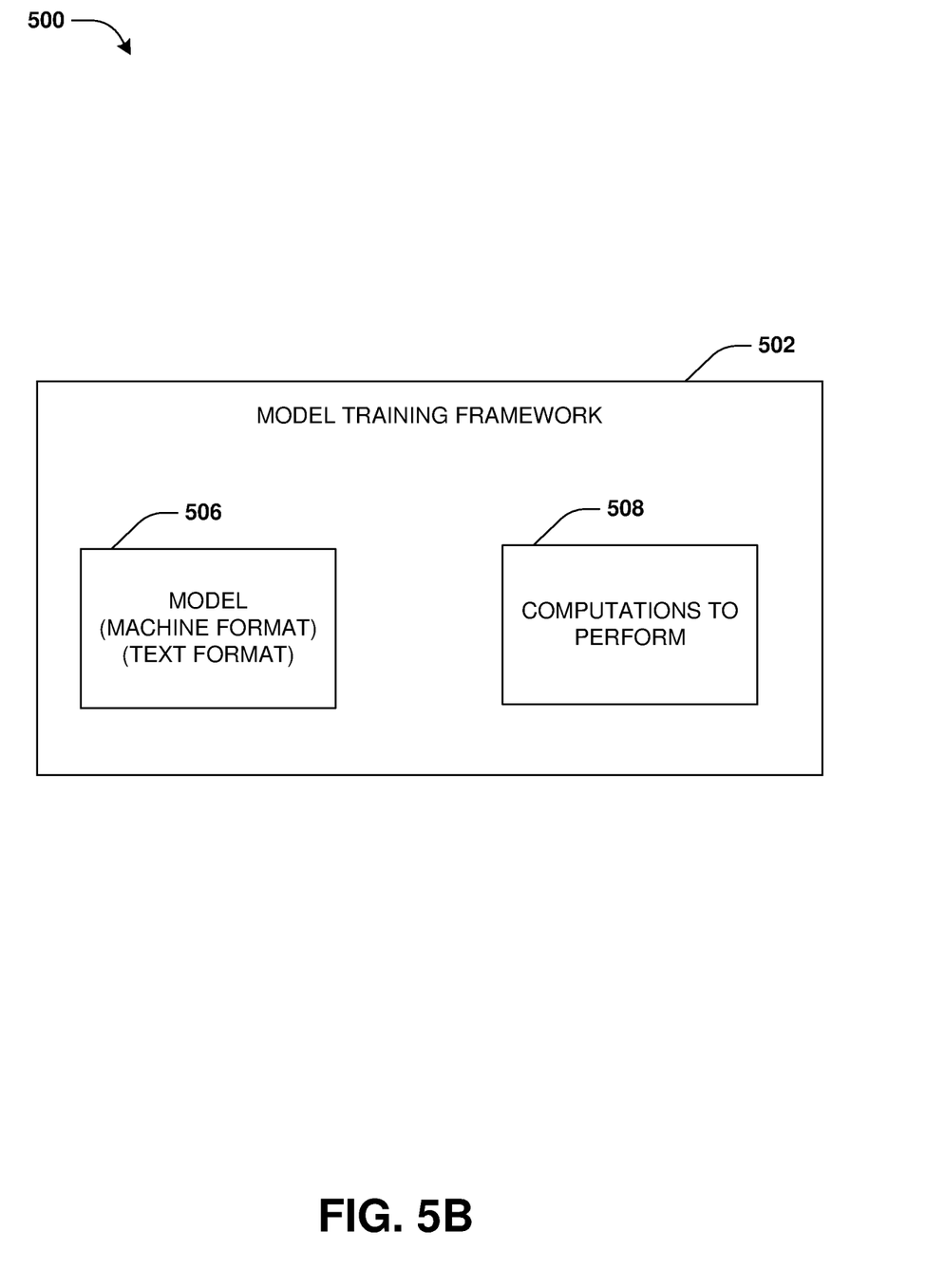
FIG. 5B is a component block diagram illustrating an example system for a model training framework, where computations that a model will perform are set up.

At 404, the model training framework 502 may set up computations 508 that the model 506 will perform during training of the model 506, as illustrated by FIG. 5B. The computations 508 may be identified and setup by the model training framework 502 based upon the definition and configuration of the model 506. In an example, the model training framework 502 may assign the computations 508 across multiple processors, such as graphical processing units, so that some computations 508 may be performed in parallel. This may reduce the training time of the model 506 by efficiently utilizing available resources as opposed the all computations being performed by a single processing unit. The model training framework 502 may be configured to aggregate outputs from the processors in order to generate an overall output of the model 506 during training.

In an example, the model training framework 502 may apply various modifications to the model 506 for training. For example, the model training framework 502 may add weights to the model 506 based upon regularization information specified within the configuration of the input 504. The model training framework 502 may apply any optimizations specified by the input 504 to the model 506.

In an example of regularization, a regularization term is added to the loss function (e.g., the function that training is working towards minimizing) for each parameter of the model 506 during training. Regularization may be any technique used to make a machine learning model generalize better to unseen data, possibly at the expense of performance on the training data. The regularization added may be referred to as weight decay or L2 regularization, and corresponds to increasing the loss function when numerical values of the parameters are larger. The model training framework 502 automatically adds this regularization, and incorporates a subset of the parameters of the model 506 specified by the user with a regular expression or other filtering function (e.g., incorporating all trainable model parameters by default). The user may also specify a strength of this regularization (e.g., a relative weight of the term in the loss function compared to the loss defined in the model definition), which could be zero or any other value.

At 406, summary statistics 510 that are to be tracked during training are specified by the model training framework 502. For example, the model training framework 502 may specify the summary statistics to track as a training loss function used to update parameters of the model 506 during training, a value of regularization loss to add to the parameters during training, a learning rate, performance statistics of the model 506 during training, outputs of the model 506, and/or a wide variety of other information relating to the training of the model 506.

Figure 5C:
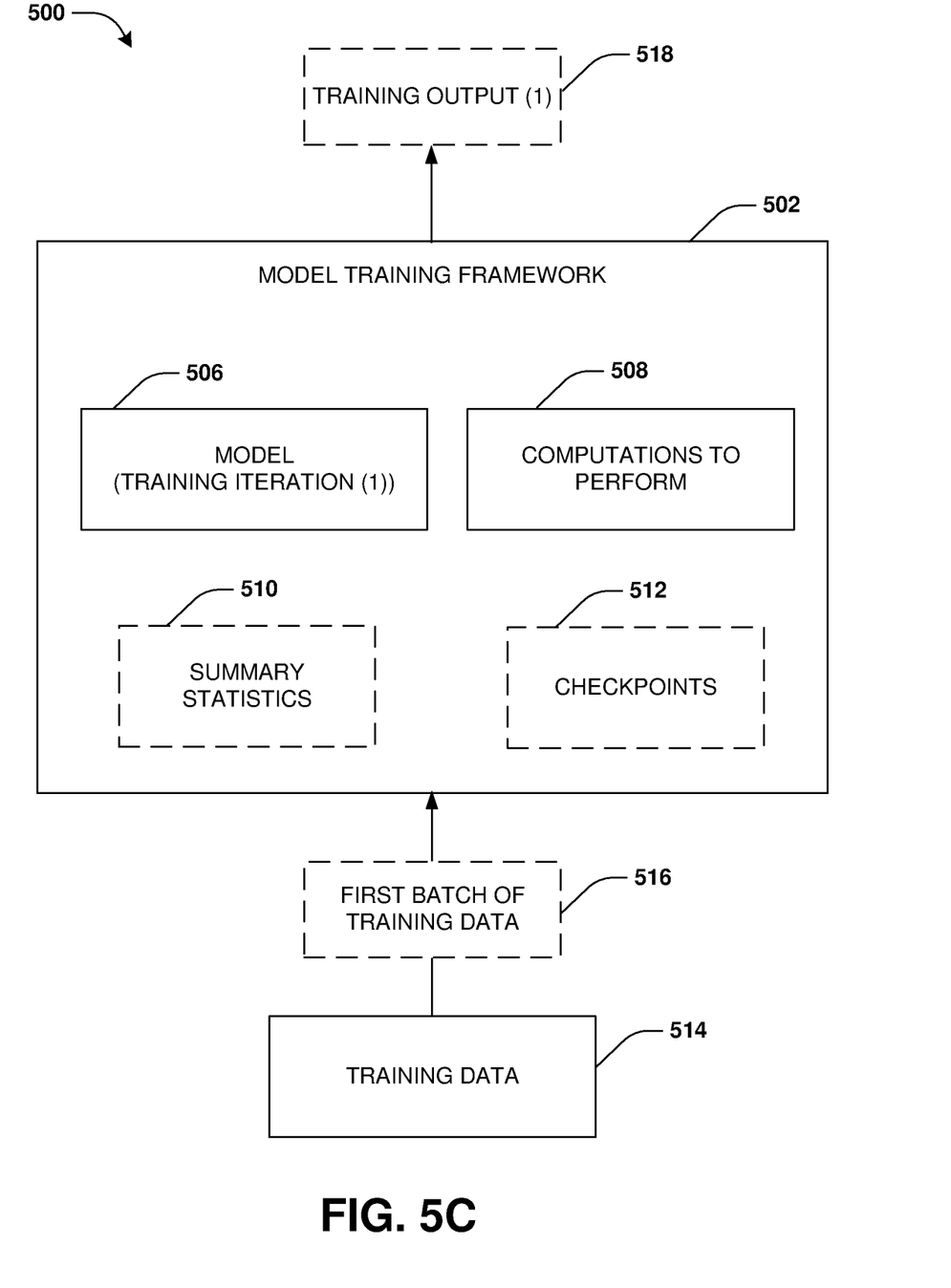
FIG. 5C is a component block diagram illustrating an example system for a model training framework, where a first training iteration is performed.

The model training framework 502 may perform one or more training iterations to train the model 506 based upon batches of training data 514, at 408. For example, the model training framework 502 may perform a first training iteration, as illustrated by FIG. 5C. The model training framework 502 may acquire a first batch 516 of training data 514. The first batch 516 of the training data 514 may comprise an amount of the training data 514 corresponding to the batch size specified for training the model 506. The model training framework 502 inputs the first batch 516 of the training data 514 into the model 506 for training the model 506 based upon the hyper parameters specified within the configuration of the model 506. In this way, the computations 508 performed by the model 506 will process the first batch 516 of the training data 514 to generate a first output 518. During the first training iteration, the summary statistics 510 are tracked and stored by the model training framework 502. During the first training iteration, current values of the parameters may be periodically saved as the summary statistics 510. Other information may be saved as the summary statistics 510, such as a number of steps performed by the computations 508 of the model 506, a current value of the function (the loss function), a current value of a learning rate, a total training time, etc.

During the first training iteration, the model training framework 502 may generate one or more checkpoints 512. A checkpoint may comprise progress of the model 506 during the first training iteration. The checkpoint may be used to restart the first training iteration from the checkpoint so that the entire first training iteration does not need to be restarted. The checkpoint may be generated based upon a user specified trigger/time, a default trigger/time, and/or based upon the model training framework 502 receiving an exit command during the first training iteration (e.g., the creation of the checkpoint may be automatically triggered based upon receipt of the exit command).

During the first training iteration, the model training framework 502 may enter into a debug mode where a user has access to execution functionality/code of the model 506 being executed by the model training framework 502. The model training framework 502 may enter into the debug mode based upon a debug mode request from the user. The model training framework 502 may enter into the debug mode based upon the configuration of the model 506 specifying that debug mode should be activated based upon some condition (e.g., an amount of training time has occurred, a particular computation is being executed, a certain amount of training data has been processed, etc.).

At 410, the parameters of the model 506 may be updated based upon a function corresponding to accuracy of the model processing the first batch 516 of the training data 514, such as a loss function (a training loss function). For example, the parameters are updated to minimize the loss function. The parameters of the model 506 may be updated during or after the first training iteration. At 412, the summary statistics 510 are outputting, such as saved or displayed to a user. The summary statistics 510 may be outputted by the model training framework 502 during or after the first training iteration.

Figure 5D:
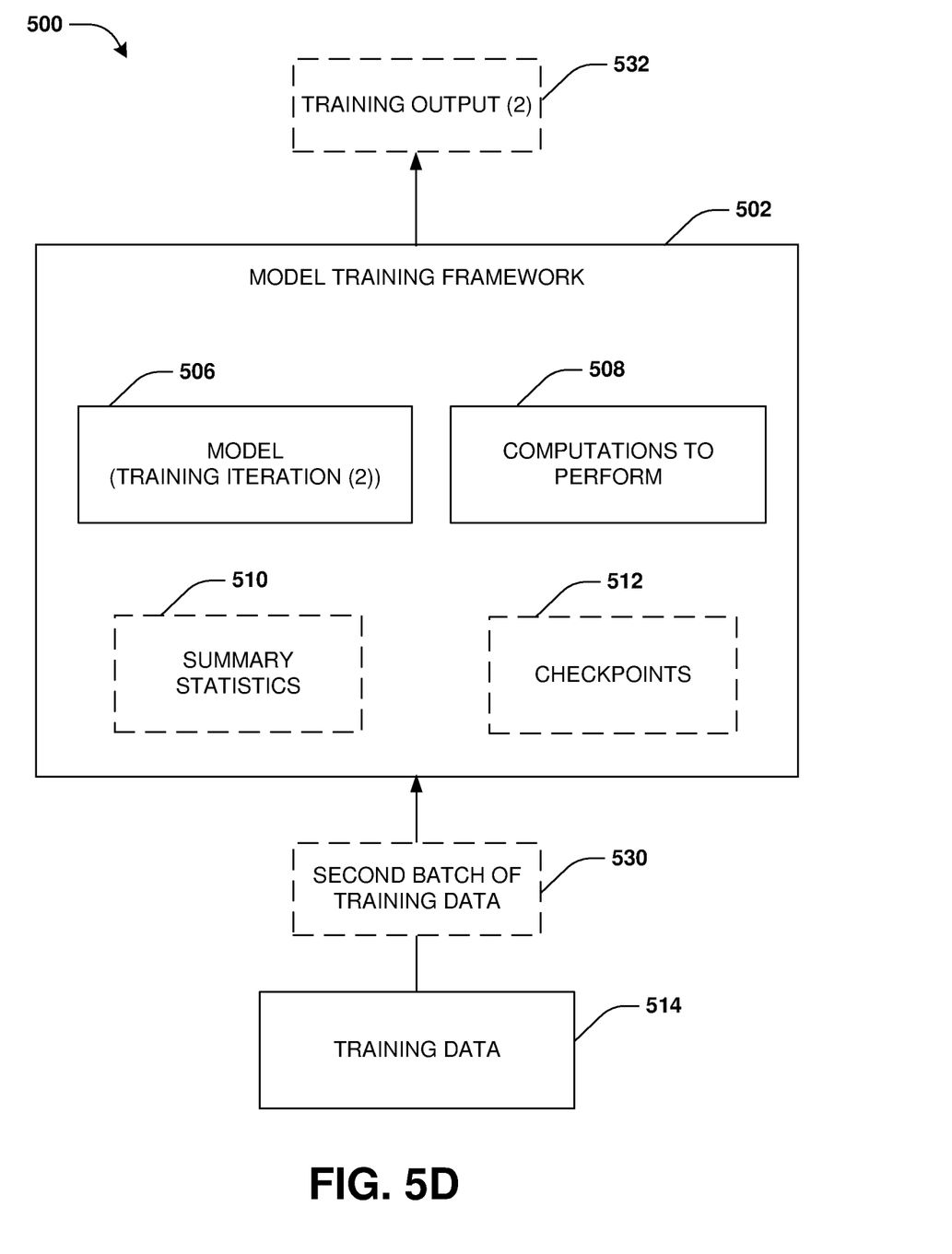
FIG. 5D is a component block diagram illustrating an example system for a model training framework, where a second training iteration is performed.

Any number of training iterations may be performed by the model training framework 502 upon the model 506, such as a second training iteration, as illustrated by FIG. 5D. During the second training iteration, the model training framework 502 may input a second batch 530 of the training data 514 into the model 506 for processing by the computations 508. The model training framework 502 may track various information during the second training iteration as the summary statistics 510. The model training framework 502 may generate one or more checkpoints 512 during the second training iteration, which can be used to restart the second training iteration at a particular checkpoint. The model 506 may generate an output 532 based upon the second training iteration, which can be evaluated to see how accurately the model 506 processed the second batch 530 of the training data 514. The model training framework 502 may adjust values of the parameters of the model 506 based upon the function (e.g., adjusting parameters to minimize the loss function) and/or the output 532 (e.g., an indication of how accurately the model 506 processed the second batch 530 of the training data 514).

In an example, the model training framework 502 may receive an action definition from the user. The action definition may specify an action to perform upon the model 506. For example, the action may be to evaluate performance of the model 506 during testing after the training is complete. The model training framework 502 may execute the action as a script upon the model 506.

In an example, the model 506 is trained to identify images having a similar characteristic as an input image. The characteristic may correspond to a depiction of an entity (e.g., an object, a person, a cat, text, etc.). In this way, a user can input a query image into the model 506 in order to receive search results of other similar images, such as images depicting a similar entity as the entity depicted by the query image. The model training framework 502 trains this model 506 by inputting pairs of images from the training data 514 into the model 506. A pair of images comprises images having a same characteristic (e.g., two images depicting a cat). Parameters of the model 506 may be updated to minimize a loss function based upon an accuracy of the model 506 to identify images having similar characteristics during training.

Once the model 506 has been trained, then the model 506 may be tested or deployed. For example, a query image may be inputted into the model 506. The model 506 may compute an embedding vector representing characteristics of the query image. The model 506 is controlled to compare the embedding vector to embedding vectors of images within a catalog of images to rank the images within the catalog according to similarity of the images to the query image. One or more of the images may be returned as query results for the query image based upon ranks of the one or more images.

Figure 6:
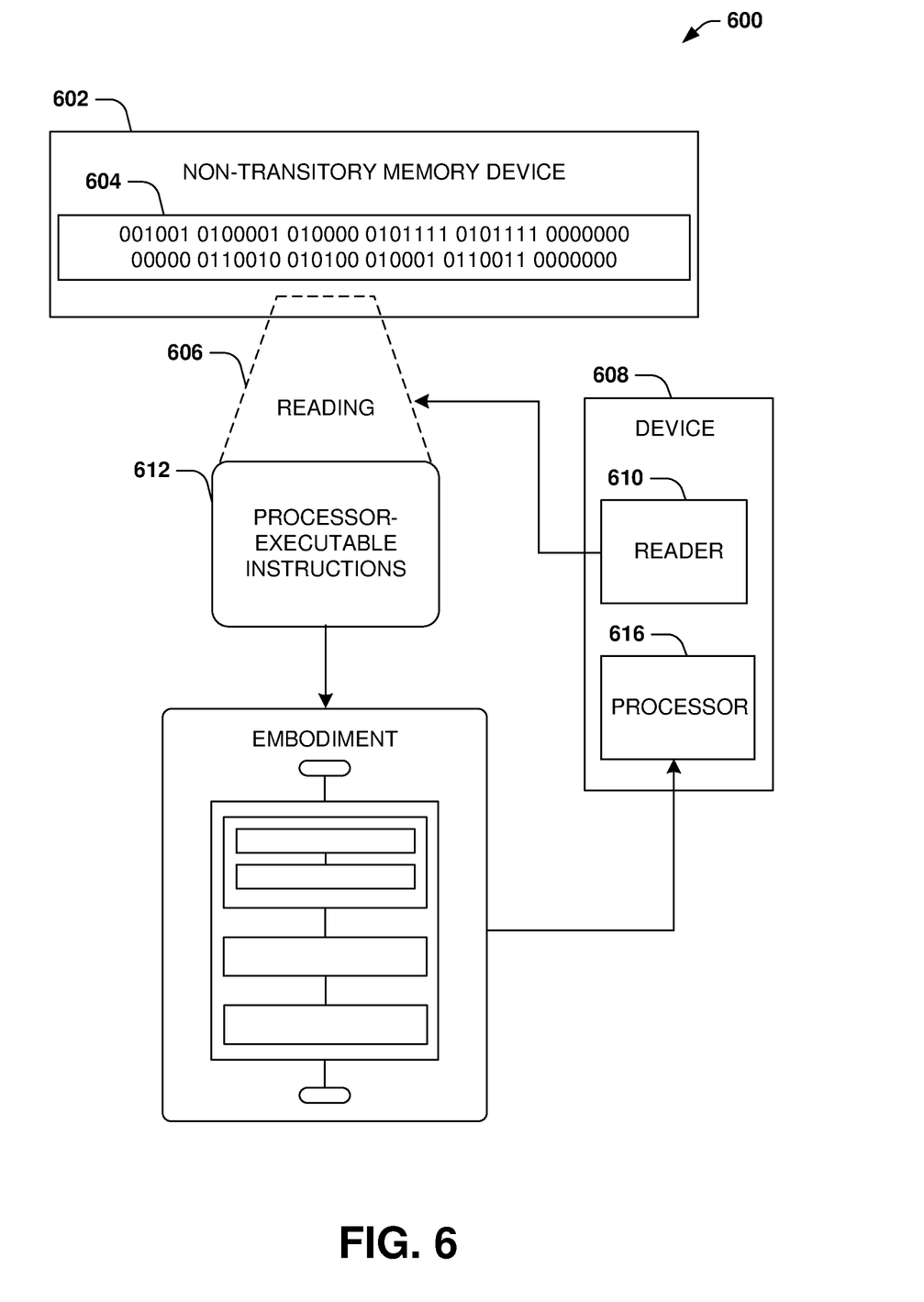
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
   receiving, by a model training framework, a definition of a first model of a first type and a configuration of the first model input by a user;
   receiving, by the model training framework, a second definition of a second model of a second type and a second configuration of the second model input by the user;
   setting up, by the model training framework and without receiving custom code for training the first model from the user, first computations that the first model will perform during training of the first model based upon the definition and the configuration input by the user;
   setting up, by the model training framework and without receiving custom code for training the second model from the user, second computations that the second model will perform during training of the second model based upon the second definition and the second configuration input by the user;
   specifying, by the model training framework, summary statistics to be tracked during the training of the first model;
   inputting, by the model training framework, a batch of training data into the first model for processing using the first computations to train the first model based upon hyper parameters specified in the configuration of the first model, wherein the summary statistics are tracked during the training, wherein the first computations are spread by the model training framework across a plurality of processing units and outputs by the plurality of processing units are aggregated to determine an output of the first model during the training;
   updating, by the model training framework, parameters of the first model based upon a function corresponding to accuracy of the first model processing the training data;
   outputting the summary statistics, wherein the summary statistics comprise a training loss function as the function used to update parameters of the first model during the training, a value of regularization loss added to the parameters during training, and a learning rate;
   performing a plurality of training iterations to train the first model using batches of the training data;
   generating a first checkpoint during the plurality of training iterations, wherein the first checkpoint comprises progress of the first model being trained during a training iteration;
   generating a second checkpoint based upon receiving an exit command during the training, wherein the second checkpoint comprises progress of the first model being trained, and wherein the second checkpoint is used to restart the training of the first model from the second checkpoint;
   entering into a debug mode during the training based upon the configuration indicating that the debug mode is to be activated; and
   saving a record of the first model, the configuration of the first model, checkpoints created during the training, a training batch size, an initial learning rate value, a decay learning rate, and parameters of the first model into at least one of a first structure having serialized machine readable format and a second structure having textual human readable format.

2. The method of claim 1, comprising:
tracking a number of steps performed by the first computations, a current value of a loss function as the function, a current value of a learning rate, and a total training time as the summary statistics.

3. The method of claim 1, comprising:
receiving an action definition of an action to perform upon the first model.

4. The method of claim 3, comprising:
executing the action as a script upon the first model.

5. The method of claim 1, comprising:
specifying, by the model training framework, second summary statistics to be tracked during the training of the second model.

6. The method of claim 5, comprising:
inputting, by the model training framework, a second batch of training data into the second model for processing using the second computations to train the second model based upon hyper parameters specified in the configuration of the second model, wherein the second summary statistics are tracked during the training of the second model.

7. The method of claim 6, comprising:
updating, by the model training framework, parameters of the second model based upon a function corresponding to accuracy of the second model processing the second batch of training data.

8. The method of claim 7, comprising:
outputting the second summary statistics.

9. The method of claim 1, comprising:
periodically saving current values of the parameters during the training iterations.

10. The method of claim 1, wherein the first type of the first model is different than the second type of the second model.

11. The method of claim 1, wherein:
the first type of the first model is one of a decision tree type of machine learning model, a support vector machine type of machine learning model, a k-nearest neighbors type of machine learning model, a random forests type of machine learning model, a linear regression type of machine learning model, a logistic regression type of machine learning model or a gradient boosting algorithm type of machine learning model; and
the second type of the second model is different than the first type of the first model and is another one of a decision tree type of machine learning model, a support vector machine type of machine learning model, a k-nearest neighbors type of machine learning model, a random forests type of machine learning model, a linear regression type of machine learning model, a logistic regression type of machine learning model or a gradient boosting algorithm type of machine learning model.

12. A computing device comprising:
a processor; and
memory comprising processor-executable instructions that when executed by the processor cause performance of operations, the operations comprising:
receiving, by a model training framework, a definition of a first model of a first type and a configuration of the first model input by a user;
receiving, by the model training framework, a second definition of a second model of a second type and a second configuration of the second model input by the user;
setting up, by the model training framework and without receiving custom code for training the first model from the user, first computations that the first model will perform during training of the first model based upon the definition and the configuration input by the user;
setting up, by the model training framework and without receiving custom code for training the second model from the user, second computations that the second model will perform during training of the second model based upon the second definition and the second configuration input by the user;
specifying, by the model training framework, summary statistics to be tracked during the training of the first model;
inputting, by the model training framework, a batch of training data into the first model for processing using the first computations to train the first model based upon hyper parameters specified in the configuration of the first model, wherein the summary statistics are tracked during the training;
updating, by the model training framework, parameters of the first model based upon a function corresponding to accuracy of the first model processing the training data;
outputting the summary statistics, wherein the summary statistics comprise a training loss function as the function used to update parameters of the first model during the training, a value of regularization loss added to the parameters during training, and a learning rate;
performing a plurality of training iterations to train the first model using batches of the training data;
generating a first checkpoint during the plurality of training iterations, wherein the first checkpoint comprises progress of the first model being trained during a training iteration;
generating a second checkpoint based upon receiving an exit command during the training, wherein the second checkpoint comprises progress of the first model being trained, and wherein the second checkpoint is used to restart the training of the first model from the second checkpoint;
entering into a debug mode during the training based upon the configuration indicating that the debug mode is to be activated; and
saving a record of the first model, the configuration of the first model, checkpoints created during the training, a training batch size, an initial learning rate value, a decay learning rate, and parameters of the first model into at least one of a first structure having serialized machine readable format and a second structure having textual human readable format.

13. The computing device of claim 12, wherein the operations comprise:
assigning the first computations across a plurality of processing units for execution.

14. The computing device of claim 13, wherein the operations comprise:
aggregating outputs from the plurality of processing units to determine an output of the first model.

15. The computing device of claim 12, wherein the operations comprise:
tracking a number of steps performed by the first computations, a current value of a loss function as the function, a current value of a learning rate, and a total training time as the summary statistics.

16. The computing device of claim 12, wherein the operations comprise:
receiving an action definition of an action to perform upon the first model; and
executing the action as a script upon the first model.

17. The computing device of claim 12, wherein the operations comprise:
specifying, by the model training framework, second summary statistics to be tracked during the training of the second model;
inputting, by the model training framework, a second batch of training data into the second model for processing using the second computations to train the second model based upon hyper parameters specified in the configuration of the second model, wherein the second summary statistics are tracked during the training of the second model:
updating, by the model training framework, parameters of the second model based upon a function corresponding to accuracy of the second model processing the second batch of training data; and
outputting the second summary statistics.

18. A non-transitory machine readable medium having stored thereon processor-executable instructions that when executed cause performance of operations, the operations comprising:
receiving a definition of a model and a configuration of the model input by a user;
receiving a second definition of a second model and a second configuration of the second model input by the user;
setting up, without receiving custom code for training the model from the user, first computations that the model will perform during training of the model based upon the definition and the configuration;

setting up, without receiving custom code for training the second model from the user, second computations that the second model will perform during training of the second model based upon the second definition and the second configuration input by the user;

specifying summary statistics to be tracked during the training;

inputting a batch of training data into the model for processing using the first computations to train the model based upon hyper parameters specified in the configuration of the model, wherein the summary statistics are tracked during the training, wherein the first computations are spread by a model training framework across a plurality of processing units and outputs by the plurality of processing units are aggregated to determine an output of the model during the training;

updating parameters of the model based upon a function corresponding to accuracy of the model processing the training data;

outputting the summary statistics, wherein the summary statistics comprise a training loss function as the function used to update parameters of the model during the training, a value of regularization loss added to the parameters during training, and a learning rate;

performing a plurality of training iterations to train the model using batches of the training data;

generating a first checkpoint during the plurality of training iterations. wherein the first checkpoint comprises progress of the model being trained during a training iteration;

generating a second checkpoint based upon receiving an exit command during the training, wherein the second checkpoint comprises progress of the model being trained, and wherein the second checkpoint is used to restart the training of the model from the second checkpoint;

entering into a debug mode during the training based upon the configuration indicating that the debug mode is to be activated; and saving a record of the model, the configuration of the model, checkpoints created during the training, a training batch size, an initial learning rate value, a decay learning rate, and parameters of the model into at least one of a first structure having serialized machine readable format and a second structure having textual human readable format.

19. The non-transitory machine readable medium of claim 18, wherein the operations comprise:

inputting pairs of images from the training data into the model during training of the model to train the model to identify images having a similar characteristic as an input image, wherein a pair of images comprises images having a same characteristic; and updating the parameters of the model to minimize a loss function as the function based upon an accuracy of the model to identify images having similar characteristics during the training.

20. The non-transitory machine readable medium of claim 18, wherein the operations comprise:

inputting a query image into the model, wherein the model computes an embedding vector representing characteristics of the query image;

controlling the model to compare the embedding vector with embedding vectors of images to rank the images according to similarity of the images to the query image; and returning one or more of the images as query results for the query image based upon ranks of the images.

* * * * *